Inventors
Frank S. Hyer
Raymond Karosas
By
Attorney

United States Patent Office 3,559,451
Patented Feb. 2, 1971

3,559,451
WEIGHING SCALE SYSTEM FOR A CONVEYOR WITH FOOTAGE COUNTER FOR IMPROVED CALIBRATION
Frank S. Hyer, Duxbury, and Raymond Karosas, Quincy, Mass., assignors to Cutler-Hammer, Inc., Milwaukee, Wis., a corporation of Delaware
Filed Dec. 22, 1969, Ser. No. 886,856
Int. Cl. G01g *11/14*
U.S. Cl. 73—1                                                           7 Claims

ABSTRACT OF THE DISCLOSURE

An integrating system for indicating the total weight of material that has been moved by an endless belt-conveyor over a weighing scale. The system must periodically be re-calibrated for "zero" and "span" due to a number of variables such as nonuniformity of the belt, material sticking to the belt, etc. A predetermining footage counter is manually preset to the total number of feet required for the calibration run. This counter counts downwards and when it counts out, it stops the output to the weight totalizer. The system is first run for a zero calibration and if the reading is off, the zero adjusting device is turned in the proper direction until the reading is close enough on a re-run. The system is then run for a span calibration and if the reading is off, the non-interacting span adjusting device is turned in the proper direction until the reading is close enough on a re-run. In each case, the footage counter precisely controls the amount of conveyor footage that is totalized to avoid laborious manual measurement and computation. Other features such as rate indication, low level detection, closed loop controls and timed interlocking between the integrator output and the conveyor motor control, and the like, are incorporated into the system.

BACKGROUND OF THE INVENTION

A number of different design approaches for material-in-motion measurement have been known heretofore. Some systems use entirely mechanical means for the measurement and integration of material flow. The known ball and disk or cone and disk multipliers in conjunction with mechanical lever type scales represent the early versions of this class of apparatus. Later types incorporate servo-mechanisms and repeaters for the transmission of weight and speed signals to remotely located mechanical integrating apparatus. More recently, the strain gauge load cell and the tachometer generator speed sensor have emerged as a convenient combination where control and recording functions are required.

The advantages and disadvantages of the different types of systems have not been clearly defined and performance in terms of accuracy has often been dependent more on the care exercised in the design and selection of components than on whether a system is mechanical, electronic or a combination of both. However, it is generally acknowledged that an all solid state elecronic system offers the greatest probabilities in terms of reliable and maintenance free operation. While early approaches in this direction have proven reasonably successful in short term measurement capability, they have generally lacked the long term stability to be considered reliable over extended periods of time without frequent calibration. This has become particularly important in view of the uninterrupted operation demanded by many of the modern processes.

Scales suitable for mounting beneath a belt conveyor can be used to totalize, proportion, control and batch out material continuously for an automated operation. An essential element of both measurement and control is the accurate determination of gravimetric flow rate, that is, weight per unit of time. In the control of material in transit, comparison of a signal proportioned to such rate with the desired level or set point of such rate signal provides an error signal whereby corrective action is taken by the controller. In the measurement of material in transit, such rate signal is integrated with respect to time (speed signal or belt travel) to provide an indication of the total material that has passed the scale.

Generally, the determination of belt scale system accuracy involves three areas of consideration. First is the accuracy and stability of the scale and integrating system. This includes the accuracy with which the input variables of scale loading and belt speed can be integrated and the resulting output displayed. Second is the effectiveness with which true belt loading and belt speed can be measured by the primary transducers, that is, the scale and the belt contact measuring wheel. The effectiveness with which the scale can sense material loading is diminished by so-called belt effects. These effects are associated with variations in belt tension and belt stiffness and are directly related to the degree of misalignment between scale idlers and adjacent stationery idlers. Other sources of error which can be controlled through proper maintenance incude material built-up on weighed parts and material adherence to the surface of the belt contact wheel. Third is the precision to which the system can be calibrated to correspond to actual running conditions. The present invention relates primarily to this third area of consideration and to improved calibrating means for an endless-belt conveyor weighing system.

SUMMARY OF THE INVENTION

This invention relates to an integrated-circuit weighing scale measurement and control system that incorporates improved calibration means for doing automatically what has previously been a laborious manual procedure.

An object of the invention is to provide a gravimetric flow rate and totalizing system with improved calibrating means.

A more specific object of the invention is to provide a moving material weighing and integrating system with improved calibration means that automatically controls totalizing the weight when running the conveyor through an exact preset distance repeatedly for calibration purposes.

Another specific object of the invention is to provide a conveyed material weighing system with improved calibration means including a predetermining footage counter for automatically stopping the weight totalizing of the conveyor for a preset calibration run and affording accurate repeatability to simplify zero and span calibration.

Other objects and advantages of the invention will hereinafter appear.

DESCRIPTION OF THE PREFERRED EMBODIMENT

Figure 1A:
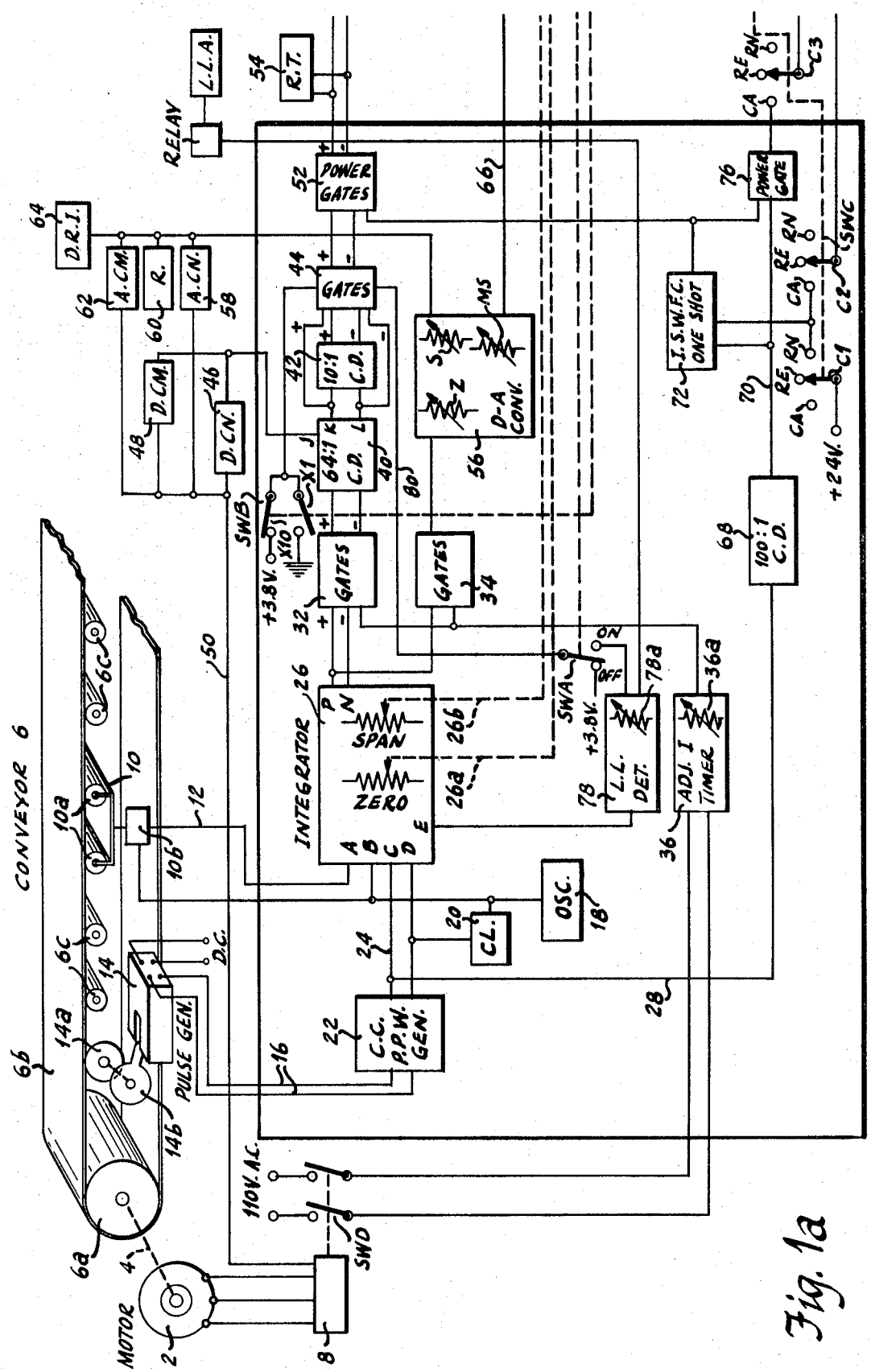
FIGS. 1*a* and 1*b* show a weighing scale system for a conveyor with footage counter for improved calibration that is constructed in accordance with the invention.
Figure 1B:
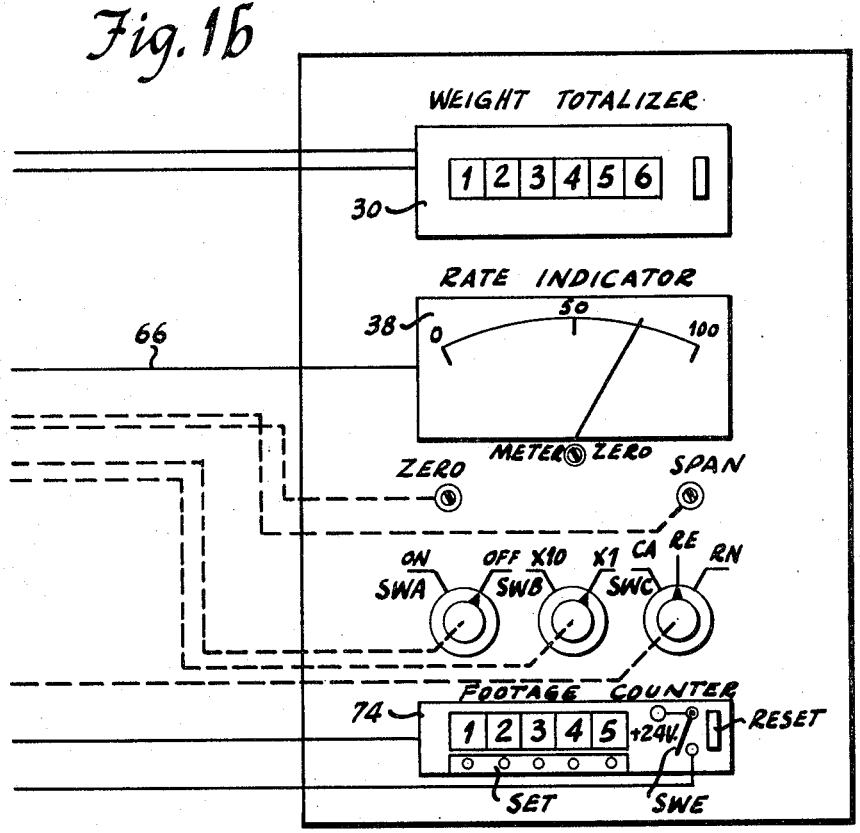

Referring to FIGS. 1*a* and 1*b*, there is shown a system for handling material in bulk and for weighing this material as it is being moved by an endless-belt conveyor. The system provides an indication of the total weight of material delivered and the rate of delivery.

As shown in FIG. 1*a*, a drive motor 2 is coupled by a shaft 4, gearing or the like to a drive roller 6*a* of a conveyor 6. This conveyor may have an endless belt 6*b* or the like whereby it conveys bulk material or the like. This conveyor is also provided with idler rollers 6*c* beneath the upper run of the belt for supporting the material that is conveyed thereon. The other end of the belt travels around an idler roller (not shown) similar to drive roller 6 to complete the conveyor structure.

Motor 2 may be of the alternating current type or the like and is controlled by a motor control circuit 8 that controllably supplies alternating current power to the motor through the three phase line connected therebetween. As is conventional in such cases, this motor control circuit is provided with an on-off switch that may be closed manually to start the conveyor running. The conveyor is stopped by opening this on-off switch to disconnect power from the conveyor drive motor. This motor control switch has coupled thereto as shown by a broken line an interlocking switch SWD that shuts off the system after the conveyor has coasted to a stop as hereinafter more fully described. As shown in FIG. 1a, this switch SWD is a single-throw double-pole type that closes when the motor control on-off switch is opened and vice versa.

In order to determine how much material is being conveyed, it is necessary to provide a weight signal and a speed signal. By using these two signals, it is possible to operate a rate indicator to show the moving rate such as tons per hour of material passing along the conveyor. It is also possible to indicate the total weight by integrating these signals.

To this end, the system is provided with means for determining the weight per unit length of loaded conveyor belt. This means comprises a scale 10 having idler rollers 10a over which the upper run of the belt passes and a load cell 10b that detects the weight passing on the scale rollers. This load cell puts out a signal proportional to such weight to output conductor 12, this signal being a D.C. voltage.

Figure 2:
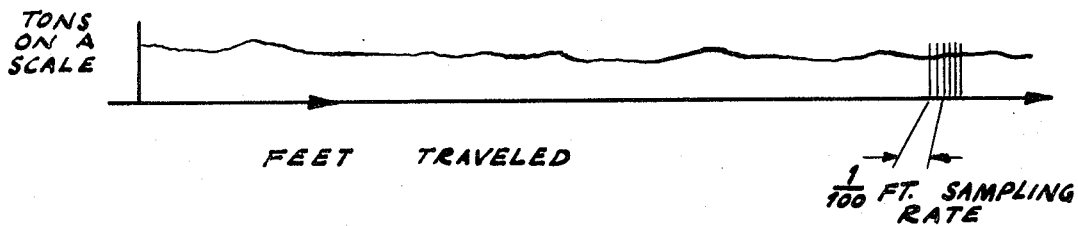
FIG. 2 graphically depicts operating characteristics of the system of FIG. 1.

Also, to this end, the system is provided with means for sensing the speed of the conveyor belt. This means comprises a pulse generator 14 mounted beneath the upper run of the conveyor belt. This pulse generator comprises a wheel or disc 14a that is in contact with the conveyor belt and is rotated thereby. This disc drives a rotary vane 14b (apertured disc or the like) of the pulse generator that generates a predetermined number of pulses per unit length of moving conveyor belt. For exemplary purposes, it may be assumed that one hundred pulses are generated for each foot of travel of the belt as indicated by the sampling rate in FIG. 2. Pulse generators of the vane switched oscillator type usable herein are known and the details thereof have not been shown to avoid complicating the drawing. The pulse generator is provided with a D.C. supply voltage connected to the first pair of terminals. The pulse generator includes an oscillator and a diode rectifier that is connected to a separate coupling winding of the oscillator. In this manner, an isolated D.C. output is obtained and may be applied to external circuitry. When the metallic vane enters the gap that is between the oscillator coil windings, the oscillations stop and the D.C. output drops to zero. In this manner, the pulse generator provides D.C. output pulses when the belt driven disc rotates the vane through the gap repeatedly. These output pulses are applied to conductors 16 connected to the other pair of terminals.

In order for load cell 10b to provide an output signal that is proportional to the weight of material, it is energized by an A.C. voltage from an oscillator 18. This is a sinusoidal oscillator that provides a sine wave voltage of a predetermined frequency such as 1060 Hz. or the like to the load cell. Since load cells usable herein are well known, the details thereof have not ben shown to avoid complicating the drawing. Load cells of this type preferably contain an LVDT (linear variable differential transformer) having a primary winding that is excited by the sinusoidal voltage, an armature that is moved by the weight on the conveyor belt, and a pair of secondary windings that provide an induced output voltage proportional to the armature movement. By rectifying the secondary current, there is provided on conductor 12 in FIG. 1a a D.C. voltage proportional to the weight on the scale.

From the foregoing, it will be apparent that the scale provides a D.C. voltage having an amplitude relative to ground proportional to the load on the scale at any instant of time, and the pulse generator provides one hundred pulses per one foot of belt travel, that is, a train of pulses proportional to the distance the load has traveled. It will be seen that by integrating his D.C. voltage and these pulses, it is possible to provide an indication of the total weight of material that has been conveyed past the scale. It is also possible to provide an indication of the rate at which material is being conveyed. These functions are performed by the remainder of the system, shown in FIGS. 1a and 1b as hereinafter described.

But in order to provide accurate indications of the total weight of material that has been conveyed, it is necessary to calibrate the system for both zero and span. Zero calibration refers to adjusting the integrator so that the weight totalizer shows zero weight after the conveyor belt has been run empty for the required number of circuits. Span calibration refers to adjustment of the integrator so that the weight totalizer shows the correct muliple of a test weight after the conveyor belt has been run loaded with the test weight for the required number of circuits. The manner and means whereby the system may be initially calibrated and periodically recalibrated in an uncomplicated and accurate manner by use of a controlling footage counter will hereinafter be described following a general description of the integrating system.

As shown in FIG 1a, sinusoidal oscillator 18 also supplies means whereby the system functions are performed and maintained in proper synchronism. This means comprises a clock pulse circuit 20. The sine wave voltage of the oscillator operates this clock pulse circuit to cause it to provide uniformly spaced and uniform length square wave voltage clock pulses that are precisely synchronized with the sine wave zero crossover points.

These clock pulses are applied from clock pulse circuit 20 to a clock controlled preset pulse width generator circuit 22. This clock controlled preset pulse width generator circuit receives not only these clock pulses but also the train of D.C. pulses from conductors 16 that represent the distance the conveyor moves. This train of D.C. pulses has a frequency that is proportional to the speed of the conveyor. These D.C. pulses that are called speed pulses enter the clock controlled preset pulse width generator circuit where they are shaped to square wave and placed in proper phase with the clock pulses and wherein they operate an electronic counter that counts a preset number of clock pulses and then shuts off and does this repeatedly as long as speed pulses come in from conductors 16. These newly generated pulses, identified as the "fill" pulses, are applied to output conductor 24.

The term "fill" pulse comes from the fact that this pulse is used to control charging (filling) of an integrating capacitor. The term "dipout" pulse hereinafter described comes from the fact that it is used to control discharging of the capacitor. Since any integrating capacitor has a limited capacity and will soon reach its full capacity and stop integrating, in order to use it continuously, it is charged by the fill pulses and is discharged in uniform amounts by the dipout pulses. Then by counting these dipout pulses, the total integration is determined and the system can be run continuously.

For this purpose, there is provided an integrator circuit 26. This integrator circuit receives four signals for its operation. The weight signal from conductor 12 comes in at its output terminal A. A sine wave voltage from oscillator 18 comes in at its input terminal B. The fill pulses from conductor 24 came in at its input terminal C. And the clock pulses from clock circuit 20 come in at its input terminal D.

The fill pulses from conductor 24 are also applied through conductor 28 to a circuit for controlling zero and span calibration of the system as hereinafter described.

The integrator circuit receives the aforesaid four signals at its input terminals A, B, C and D, performs the necessary functions and provides the weight information in terms of pulses at output terminal P or output terminal N. The pulses at output terminal P are indicative of positive weight information due to a loaded belt and the pulses at output terminal N are indicative of negative weight information, occurring primarily during calibration and during operation only if practically no material is flowing. From this it will be apparent that the integrator circuit is bidirectional in that it can integrate both positive and negative weight signals. This is necessary because a belt that is run through several circuits for zero calibration may have areas of below zero weight (negative or below average empty weight) as well as areas of above zero weight (positive or above average empty weight).

More specifically, the integrator circuit uses the fill pulses (speed) at input C to gate the negative D.C. voltage (positive weight) at input A to charge a voltage integrating capacitor. The sine wave voltage at input B is used to develop dipout signals under the synchronizing control of the clock pulses at input D. For this purpose, a dipout signal (one-half cycle of sine wave) is produced whenever the integrated voltage reaches or exceeds a predetermined value. The dipout signal is a positive half-cycle when the integrated voltage reaches such value in the negative direction (positive weight). This dipout signal is a negative half-cycle when the integrated voltage reaches such value in the positive direction (negative weight). This selection of the positive or negative half-cycle of the sine wave to serve as the dipout signal is controlled by the inverted clock pulses and clock pulses, respectively. So long as the integrated voltage exceeds the predetermined value, the clock or inverted clock pulses will be allowed to pass through and gate the proper half-cycles of the sine wave to serve as dipout pulses. These dipout pulses, of course, discharge the integrating capacitor in equal incremental amounts. The algebraic sum of the dipouts is indicative of the total weight that has passed the scale. The details of this integrator circuit have not been shown herein as unnecessary for an understanding of this invention but are disclosed in R. Karosas' copending application Ser. No. 9,901, filed Feb. 9, 1970 assigned to the same assignee.

These clock pulses that are passed as a result of positive weight integration are also applied to output terminal P. And the clock pulses that are passed as a result of negative weight integration are applied to output terminal N of the integrator circuit. It will therefore, be apparent that each pulse at output P represents a uniform increment of weight and each pulse at output N represents a uniform decrement of weight. By using the pulses at output P to run weight totalizer 30 in FIG. 1b up and by using the pulses at output N to run this weight totalizer down, the total weight is indicated.

The transmission of the integrator output signals is controlled by gate circuit 32 and gate circuit 34. Both the P and N outputs of the integrator are connected to gate circuit 32. Output P of the integrator is also connected to gate circuit 34. Both of these gate circuits are controlled by an adjustable interlock timer 36. The purpose of this timer is to maintain these gate circuits on for a period of time after the conveyor is turned off to allow the conveyor time to coast to a stop and then to turn these gate circuits off to prevent further transmission of pulses to the weight totalizer. This prevents erroneous readings.

For this purpose, interlock switch SWD closes when the motor control switch is opened. This connects A.C. voltage to adjustable interlock timer 36 to start it timing. The time period of this timer may be adjusted at variable resistor 36a to the time it takes the conveyor to coast to a stop after it is turned off at the motor control switch or a little longer time. When this timer times out, it turns gate circuits 32 and 34 off so that no further pulses can pass therethrough. As will be apparent, gate circuit 32 passes pulses for operation of the weight totalizer and gate circuit 34 passes pulses for operation of rate indicator 38 in FIG. 1b.

For weight totalization, the positive and negative outputs of gate circuit 32 are connected to two inputs, respectively, of a preset type countdown circuit 40. In this circuit, the pulses are scaled down in a binary fashion to as low as 64 to 1. This circuit has one count down counter for the positive weight indicative pulses and a second count down counter for the negative weight indicative pulses and respective output terminals K and L at which the lower frequency pulses appear.

The system provides for a selection at this point for a still further countdown of the positive and negative pulses or for transmission of these pulses without frequency change. The means for doing this comprises a pair of two-branched outputs from countdown circuit 40. First branches of these positive and negative outputs go through a 10 to 1 countdown counter circuit 42 to a first pair of inputs of a gate circuit 44. Second branches of these positive and negative outputs go directly to a second pair of inputs of gate circuit 44, by-passing the 10 to 1 countdown counter.

Gate circuit 44 is provided with AND gates or the like for selecting the pulses at either pair of its inputs under the control of a manual switch SWB. If this manual switch is left in the position shown with its contact X10 closed, positive D.C. voltage (high) is connected therethrough to gate circuit 44, causing it to pass the pulses coming directly from countdown counter circuit 40. If the manual switch is turned to its other position to close its contact X1, ground potential (low) is connected to gate circuit 44, causing it to pass the pulses coming from 10 to 1 countdown circuit 42, which counted down the pulses that it received by a factor of ten.

The purpose of these countdown counters is to match the frequencies of the pulse trains to the apparatus that they must operate. After the pulses have been scaled down to 64 to 1, output J of countdown counter 40 feeds this digital information to external instruments such as a digital controller 46 and/or a digital computer 48. To form a closed loop system, one or both of these instruments may be connected through a conductor 50 to motor controller 8. In this way, the conveyor speed may be regulated to compensate for any unwanted variation in the digital information at output J of countdown counter 40.

The pulses at outputs K and L of countdown counter 40 may be scaled down further by a factor of 10 to 1 to meet the weight totalizer 30 counter requirement which could be different from the external digital instruments requirement. This is the reason countdown counter 42 is provided.

The positive and negative outputs of gate circuit 44 are connected through a power gates circuit 52 to the weight totalizer in FIG. 1b. Each pulse appearing on the positive output terminal steps the weight totalizer up. And each pulse appearing on the negative output terminal steps the weight totalizer down. In this manner, there is provided a running indication of the total weight of material that has been conveyed past the scale.

As shown at the right hand portion of FIG. 1a, the outputs of power gates circuit 52 may also be connected to a remote totalizer 54 to afford an indication at a remote location.

The system is also provided with means for indicating the rate at which material is being conveyed. This means comprises gate circuit 34, a digital to analog converter 56 and rate indicator 38. Gate circuit 34 passes pulses representing positive weight information only. This gate circuit is also controlled by adjustable interlock timer 36 and is shut off by the latter when the conveyor is stopped. The output of gate circuit 34 is connected to digital to analog converter 56, wherein the pulse frequency representing positive weight information is converted into a proportional D.C. voltage. This voltage at one output controls instruments such as an analog controller 58, a recorder 60 or an analog computer 62. By the use of a digital voltmeter, this signal could easily be converted into digital form and the digital voltmeter's binary coded decimal output could be fed into a printer or some other digital instrument such as a digital rate indicator 64.

The outputs of analog controller 58 and/or analog computer 62 may be connected through conductor 50 to motor control circuit 8 to form a closed loop system for regulation purposes.

The proportional D.C. voltage at the other output of the digital to analog converter is used to supply current through conductor 66 to rate meter or indicator 38, this meter being on the front panel as shown in FIG. 1b. The meter zero adjusting device is located directly below the meter. As indicated schematically by variable resistors, the digital to analog converter is provided with a zero adjustment Z, a span adjustment S and a meter span adjustment MS.

Of considerable importance to the user is the tedious procedure for span calibration that he has had to go through, and which required an accurate measurement of belt travel and subsequent calculations to account for over or under travel when the conveyor was shut down. Not only was this procedure time consuming but there was also a good chance for human error. In the invention, belt travel information is directly extracted from the belt measuring wheel. The number of feet that the conveyor is desired to be run for calibration purposes is manually set into the predetermined footage counter which, when pulsed, counts down to zero. The predetermined counter will automatically stop the integrator output when the desired test footage is reached. Thus, the calibration procedure is much simpler, repeatable and more accurate and reliable since there is less chance for human error.

For this purpose, the conveyor speed pulses or fill pulses that go to the integrator are also applied from the clock controlled preset pulse width generator through conductor 28 to a 100 to 1 countdown counter 68. These fill pulses are counted down by a factor of 100 and are then known as footage pulses when they leave this counter since there is one pulse per foot of conveyor travel. These footage pulses are applied through conductor 70 to control a one shot circuit 72 and a footage counter 74 shown in FIG. 1b. These footage pulses go from conductor 70 through a power gate circuit 76.

The purpose of this one shot circuit is to turn on power gates circuit 52 to allow it to pass weight pulses to the weight totalizer, and to turn on power gate circuit 76 to allow it to pass footage pulses. To activate this one shot circuit 72 that contains an SCR or the like, it must be supplied with plus 24 volts to the anode and triggered with the positive going edge of a footage pulse at the gate.

ZERO CALIBRATION

Let it now be assumed that it is desired to calibrate the system for zero. To do this, the conveyor is started and run empty. Switch SWC at the lower right-hand portion of FIG. 1a is placed in its ready position.

This switch SWC is a triple-pole double-throw switch. It has a center off or ready position RE, a calibrate position CA wherein contact C1 is open and contacts C2 and C3 are closed, and a run position RN wherein contact C1 is closed and contacts C2 and C3 are open.

When switch SWC is placed in its calibrate position, contact C3 thereof connects the output of power gate circuit 76 to footage counter 74 to complete a path for footage pulses. Contact C2 connects a plus 24 volts D.C. supply through contact SWE of the footage counter to one shot circuit 72.

The footage counter has a number of set buttons whereby it can be set to a predetermined count. As footage pulses are received thereby, it counts down and opens its contact SWE when the test footage is reached. The reset button may be used to reset the footage counter to the predetermined count, causing closure of its contact SWE.

Continuing with the zero calibration, the conveyor is now running empty. Switch SWC is in its ready position RE. The footage counter is then reset to its predetermined count by pressing the reset button, causing closure of its contact SWE.

Low level control switch SWA is then set to its off position. This causes a plus D.C. voltage to be connected to gates circuit 44 to turn on the same and allow weight pulses to pass therethrough.

Then totalizer multiplier switch SWB is set in its X10 position as shown to cause the pulses to by-pass countdown counter 42 to provide high resolution thereby saving time.

The number appearing on the weight totalizer is then recorded for later reference.

Calibrate switch SWC is now placed in its calibrate position CA. This will initiate the test cycle. With plus 24 volts D.C. connected through contacts SWE and C2 to one shot circuit 72, the positive going edge of the first footage pulse triggers this one shot circuit on and it will then remain on until the plus 24 volts is disconnected therefrom.

This one shot circuit controls power gate circuits 52 and 76. As a result, footage pulses pass from conductor 70 through power gate circuit 76 to the footage counter. Each footage pulse steps the footage counter down one count.

Also, if any positive or negative weight pulses are formed during this time, they pass through the system to the weight totalizer.

When the predetermined test footage is reached, the footage counter will count out and open its contact SWE. This removes the plus 24 volts supply from one shot circuit 72 causing it to de-activate power gates circuits 52 and 72. This prevents any further transmission of pulses to the footage counter or the weight totalizer.

The number on the weight totalizer is now compared with the number thereon that was previously recorded, and if it is larger, zero set potentiometer 26a of the integrator is adjusted in the proper direction, counter clockwise, in actual practice, to reduce the scale signal input to the integrator. If the weight totalizer reading is smaller than the previous reading, the zero set potentiometer is adjusted in the other direction to increase the amplitude of the scale signal input to the integrator at input A.

This zero set potentiometer adjustment adjusts the voltage bias on the input to the integrator to take care of the inherent offset of the input amplifier therein and any misadjustment of the load cell in the scale or tare build-up on the scale or the like.

The empty conveyor test run may then be repeated until the initial and final numbers on the weight totalizer are in as close agreement as desired.

SPAN CALIBRATION

To calibrate the system for span, test weights are placed on the scale or test chains are attached to the conveyor in such a manner that the precise chain position can be repeatedly attained.

The conveyor is then run with the test weights on but no material and the steps described above for zero calibration are repeated as follows:

(1) Place calibrate switch SWC on ready.
(2) Reset footage counter.
(3) Set low level switch SWA to off.
(4) Set totalizer multiplier switch SWB to X10.

(5) Record the number on the weight totalizer.
(6) Place the switch SWC in calibrate position to activate the entire test cycle.
(7) After the footage counter stops, record the number on the weight totalizer.

Since the test weight is known and the number of feet preset in the footage counter is known, the number of tons that the test should have added to the weight totalizer is also known. This is checked by subtracting the first recorded number from the second one. If this number is smaller than it should be, span adjust potentiometer 26b of the integrator should be adjusted in the proper direction (clockwise in actual practice). If it is larger than it should be, span adjust potentiometer 26b is adjusted in the other direction. The test procedure is then repeated until the weight totalizer indicates the correct weight as close as is desired.

For an example of span calibration, assume that the test weight represents 1.000 ton per foot of belt travel and that the footage counter was present at 400 feet. Also, the totalizer multiplier switch was set in the X10 position. Under these conditions, the correct number of tons accumulated on the weight totalizer should be equal to 1.000 ton per foot times 400 feet times 10 or 4000 counts.

The span adjustment adjusts the attenuation of the output signal of the same input amplifier of the integrator so that the span and zero adjustments are not interacting. In other words, the operator need not readjust the zero calibration after the span calibration has been performed.

For both zero and span calibrations, the operator will quickly learn how much the potentiometers must be turned to make the correction so that the test run need not be repeated many times.

The system shown in FIG. 1a is also provided with low level detection. The purpose of this is to prevent error if the conveyor belt is run empty for a period of time. If the belt is run empty for a long period of time, even small zero shift errors, if allowed to accumulate, could amount to a substantial error. Another purpose would be to detect a no load condition in a constant load operation and to operate an external relay which would energize an alarm or perform some other function.

To this end, integrator circuit 26 supplies a signal from its low level output E to a low level detector circuit 78. This signal may come from the output side of the weight input signal amplifier so that it will be proportional to the weight on the scale. This low level detector, as its name implies, detects a condition wherein the weight signal coming from the scale is below a predetermined value. The output of low level detector 78 is connected to the on stationary contact of a single-pole double throw switch SWA. The off stationary contact of this switch is connected to a positive D.C. voltage supply. The movable contact of this switch is connected through conductor 80 to gates circuit 44.

This low level detector controls gates circuit 44 when switch SWA is turned on so as to allow it to pass pulses to the weight totalizer when the scale signal is above such predetermined value. This can be done by having the low level detector transmit a positive D.C. voltage to an AND logic or the like in circuit 44 to cause it to pass such pulses. On the other hand, when the scale signal falls below such predetermined value, the low level detector transmits a signal at or near ground potential to circuit 44 to block the AND logic therein so that it does not pass any pulses to the weight totalizer.

The low level detector has a variable resistor 78a whereby it is provided with an adjustment range between 0 and 20 percent of full load scale signal. This can be done conveniently by adjusting the bias at the input to an amplifier in the low level detector so that the amplifier output decreases to zero (ground potential) when the scale signal falls below the aforesaid predetermined value.

When switch SWA is turned to its off position as shown in FIG. 1a, a positive D.C. voltage is applied therethrough to gates circuit 44 to keep the AND logic therein gate on to pass pulses to the weight totalizer.

D-A CONVERTER CALIBRATION

After the integrator has been calibrated for zero and span as hereinbefore described, it is necessary to perform zero and span calibration of the digital-to-analog (D-A) converter. In this connection, it should be noted that D-A converter 56 has the capability of delivering 1 to 5 milliamps, 4 to 20 milliamps, or 10 to 50 milliamps of current to enable use of different types of process control instruments therewith, such as rate meter 38, analog controller 58, recorder 60, analog computer 62 and digital rate indicator 64.

For zero calibration, low level switch SWA is turned to its on position and the conveyor belt is run empty. As a result, the low level detector will control gates circuit 44 to prevent any inadvertent pulses from passing to the weight totalizer during the zero calibration. Zero adjust potentiomter Z is then adjusted until the D-A converter provides the minimum current, 1 or 4 or 10 milliamps, for the operating range desired, depending on the system requirement. The meter zero adjuster on the rate meter in FIG. 1b is then turned in the proper direction until the meter reads zero.

For span calibration, a test weight is then placed on the scale. The span adjust potentiometer S on the D-A converter is then adjusted until the D-A converter provides the proper current, 5 or 20 or 50 milliamps, for the previously selected operating range, as indicated by a milliammeter that may be connected to one of the output terminals of the D-A converter. If necessary, meter span potentiometer MS in the D-A converter also may be adjusted to obtain the proper current. The test weight is then removed from the scale. Totalizer multiplier switch SWB is turned to close its X1 contact. Calibration switch SWC is turned to its run position RN. The system is now ready for operation.

While the system hereinbefore described is effectively adapted to fulfill the objects stated, it is to be understood that the invention is not intended to be confined to the particular preferred embodiment of weighing scale system for a conveyor with footage counter for improved calibration disclosed, inasmuch as it is susceptible of various modifications without unduly departing from the scope of the appended claims.

What is claimed is:
1. A weighing scale integrating system for a conveyor affording improved and simplified calibration comprising:
  a weighing scale associated with the conveyor so as to detect any weight on the conveyor including a test weight or material being conveyed or any weight occurring on the conveyor when empty and for providing a weight signal proportional thereto;
  a pulse generator for providing a pulse train including one speed pulse per unit length of moving conveyor and having a frequency proportional to the conveyor speed;
  integrating means for integrating the weight signal and the speed pulses to develop digital signals proportional to the rate of moving weight and comprising calibration adjustment means;
  a weight totalizer operable by said digital signals for providing a running indication of the accumulated weight of the matter that has passed the scale;
  and means affording improved and simplified calibration of said integrating means comprising:
  a predetermined counter adapted to count to a preset count indicative of the length of the conveying means selected to the run for test purposes;
  means for initiating a calibration run of the system without any material on the conveyor;
  and calibration control means operable on initiation of the calibration run for enabling transmission of said digital signals to said weight totalizer and for enabling transmission of test run control pulses proportional to said speed pulses to said predetermined counter to operate both of them until said preset count is reached whereupon before and after readings of said weight totalizer will afford an indication as to what calibration adjustment is needed.

2. The invention defined in claim 1, wherein said calibration adjustment means comprises:

means for adjusting the zero weight setting of said integrating means so that the weight totalizer will indicate no total weight increase when the conveyor is run empty through a test run;

and span adjusting means for adjusting said integrating means so that the weight totalizer will indicate the correct total weight increase when the conveyor loaded with a test weight is run through a test run;

and said zero and span adjusting means being non-interacting.

3. The invention defined in claim 1, wherein said calibration control means comprises:

a manual switch having a ready position and a calibrate position;

gating means operable when activated for passing any of said digital signals that are developed to said weight totalizer and for passing said test run control pulses to said predetermined counter;

and means responsive to the first test run control pulse following said initiation of the calibration run for activating said gating means.

4. The invention defined in claim 3, wherein said predetermined counter comprises:

a control switch;

and means for operating said control switch when said counter reaches the preset count;

and said means responsive to the first test run control pulse comprises means responsive to said operation of said control switch for de-activating said gating means.

5. In a belt scale integrating system, the combination comprising:

means for providing a weight signal having a polarity according to whether the weight detected thereby from a moving conveyor belt is above or below an average zero weight and having an amplitude proportional to the amount by which the weight deviates from such average zero weight;

means for providing a pulse train of uniform pulses having a frequency proportional to the speed of the conveyor belt;

electronic integrating means operable upon receipt of said weight signal and said pulse train for providing digital signals indicative of the gravimetric flow rate and having adjustable zero and span settings;

a weight totalizer;

gating means for controlling transmission of said digital signals to said weight totalizer whereby the latter gives a running indication of the total weight conveyed;

and means providing for calibration of the system in a simple, quick, and accurately repeatable manner comprising:

a predetermined footage counter having means to preset it for a desired count and switch means operable when it has reached that count thereby to accurately repeatably measure a test run length of conveyor belt travel;

means for initiating a test run of the conveyor;

control means operable when the test run is started and the first pulse of said train occurring thereafter is received for providing footage pulses proportional to the pulses of said pulse train, for applying these footage pulses to said counter and simultaneously activating said gating means to afford transmission of any of said digital signals that might be produced to said weight totalizer;

and said switch means being operable when the counter has reached the preset count for operating said control means to stop the transmission of both said footage pulses and said digital signals whereupon a comparison of before and after weight totalizer readings will indicate the amount of zero calibration adjustment of the integrating means that is needed if the conveyor was run empty and will indicate the amount of span calibration adjustment of the integrating means that is needed if the conveyor was run with a test weight.

6. The invention defined in claim 5, wherein said control means comprises:

means responsive to said train of pulses for providing a train of footage pulses wherein each pulse is proportional to a foot of conveyor belt travel;

and means responsive to the leading edge of the first footage pulse received after initiation of a test run for establishing a path for the footage pulses to said predetermined footage counter provided said counter has been preset closing its switch means.

7. The invention defined in claim 6, wherein said means responsive to the leading edge of the first footage pulse comprises:

a one-shot solid state circuit having supply voltage connected thereto through said switch means and through said test run initiating means thereby to render it operable by the leading edge of the first footage pulse; and said switch means opening when said counter reaches the preset count to disconnect said supply voltage from said one-shot solid state circuit to stop the test run cycle.

References Cited
UNITED STATES PATENTS

| | | | |
|---|---|---|---|
| 2,974,518 | 3/1961 | Jones | 177—16X |
| 2,990,937 | 7/1961 | Goslin | 198—39 |
| 3,396,573 | 8/1968 | Blubaugh | 177—16X |
| 3,439,524 | 4/1969 | Rogers | 73—1B |

RICHARD B. WILKINSON, Primary Examiner

G. H. MILLER, Jr., Assistant Examiner

U.S. Cl. X.R.

177—16

PO-1050
(5/69)

UNITED STATES PATENT OFFICE
CERTIFICATE OF CORRECTION

Patent No. 3,559,451      Dated February 2, 1971

Inventor(s) Frank S. Hyer & Raymond Karosas

It is certified that error appears in the above-identified patent and that said Letters Patent are hereby corrected as shown below:

Column 10, line 71, "the" should be -- be --.

Signed and sealed this 12th day of June 1973.

(SEAL)
Attest:

EDWARD M. FLETCHER, JR.      ROBERT GOTTSCHALK
Attesting Officer      Commissioner of Patents